(12) United States Patent
Förch

(10) Patent No.: US 6,789,442 B2
(45) Date of Patent: Sep. 14, 2004

(54) GEAR STAGE ASSEMBLY WITH PRELOAD TORQUE

(75) Inventor: Peter Förch, Neustadt (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/954,409

(22) Filed: Sep. 17, 2001

(65) Prior Publication Data

US 2002/0069718 A1 Jun. 13, 2002

(30) Foreign Application Priority Data

Sep. 15, 2000 (DE) .......................................... 100 45 733

(51) Int. Cl.[7] .............................................. F16H 55/18
(52) U.S. Cl. ......................... 74/409; 74/440; 74/DIG. 4
(58) Field of Search .......................... 74/409, 413, 414, 74/440, 443, 432, DIG. 4

(56) References Cited

U.S. PATENT DOCUMENTS

| | | | |
|---|---|---|---|
| 3,523,204 A | | 8/1970 | Rand |
| 5,013,949 A | * | 5/1991 | Mabe, Jr. ...................... 310/83 |
| 5,081,925 A | * | 1/1992 | Holl et al. ................... 101/148 |
| 5,341,738 A | * | 8/1994 | Emrich et al. ............... 101/232 |
| 5,569,967 A | * | 10/1996 | Rode .......................... 310/103 |
| 6,047,456 A | * | 4/2000 | Yao et al. ................ 29/407.05 |
| 6,089,116 A | * | 7/2000 | Siraky ........................ 74/424.5 |

FOREIGN PATENT DOCUMENTS

| | | | | |
|---|---|---|---|---|
| DE | 44 36 603 A1 | 4/1996 | | |
| DE | 44 38 500 C2 | 5/1996 | | |
| DE | 195 44 099 A1 | 5/1997 | | |
| JP | 04073454 A | * | 3/1992 | ........... F16H/55/18 |
| JP | 04266654 A | * | 9/1992 | ........... F16H/55/18 |

OTHER PUBLICATIONS

"Drehmomente berührungslos übertragen" [touchless torgue transmission], Der Konstrukteur 7–8/93, pp. 28–29.

* cited by examiner

Primary Examiner—David A. Bucci
Assistant Examiner—Timothy McAnulty
(74) Attorney, Agent, or Firm—Laurence A. Greenberg; Werner H. Stemer; Ralph E. Locher

(57) ABSTRACT

A gear stage assembly having a gear stage with two meshing gearwheels for mechanically transmitting a torque includes individual magnets arranged in the form of a ring on each of the gearwheels in a manner corresponding to that of the teeth of the gearwheels, for producing magnetic forces in the gear stage, individual magnets of respective ones of the magnets formed in a ring being arranged with alternating polarity in the direction of rotation and forming a stage of magnets in a ring disposed parallel to the gear stage, for producing a preload torque in the gear stage; and a varnishing unit including the gear stage assembly.

10 Claims, 2 Drawing Sheets

GEAR STAGE ASSEMBLY WITH PRELOAD TORQUE

BACKGROUND OF THE INVENTION

Field of the Invention

The invention of the instant application relates to a gear stage assembly with two meshing gearwheels for mechanically transmitting a torque, individual magnets being arranged on each gearwheel in a ringlike manner corresponding to the gearwheel teeth, for producing magnetic forces in the gear stage.

A gear stage assembly of this type has become known heretofore from the published German Patent Document DE 195 44 099 A1, at least one of the mutually associated gearwheels of a respective gear stage being magnetized and the gearwheels being attracted to one another by magnetic force. For this purpose, a permanently magnetic or a permanently magnetized material is provided in a layer fixedly resting on a front face of the magnetized gearwheel. In this regard, the layer has an axial polarization of uniform alignment over the circumference, so that one pole, respectively, faces towards the gearwheel, and the other pole faces away from it. Furthermore, a cross section of the layer perpendicular to the axis of rotation has an outline or outer contour which is at a slight distance from the circumferential edge of the gearwheel. In accordance with the state of the prior art, provision is thus made for the mutually associated load-free gearwheels, e.g., the tooth faces or flanks of a fixed and of a loose wheel, to be attracted by magnetic force. The tooth faces thus always rest against one another, regardless of whether power is being transmitted, i.e. in the engaged condition, or not, i.e., in the disengaged condition. A disadvantage of the prior art construction is, in particular, that alternating face or flank contact cannot be avoided when there is an imbalance in gearwheels or gear stages of relatively large mass.

Furthermore, varnishing units are generally known in the printing-machine industry and, therein, alternating tooth face contact can occur, for example, between the varnishing-blanket cylinder and the impression cylinder. Alternating tooth face contact is often caused by the unbalanced varnishing-blanket cylinder. This imbalance can typically be as much as about 6 Nm, for example. Due to the alternating tooth face contact, at one printing speed, the print start varies randomly from sheet to sheet, within the range of the tooth backlash, and also varies from printing speed to printing speed. This leads to registration problems and hence to lower print quality. To eliminate alternating tooth face contact, it is necessary to compensate for the maximum imbalance moment of the cylinder.

The two effects described can be avoided by installing a motorized brake with a braking torque of, for example, 10 Nm. A disadvantage, in this regard, however, is that a motor driving the gear system has to produce this torque additionally.

The publication entitled "Sonderdruck aus 'Der Konstrukteur'" (Reprint from "The Designer"] 7-8/93; pp 28, 29 describes a permanent-magnetic gear made by the firm Gerwah-Präzision, Gesellschaft für Servokomponenten und Messtechnik mbH D-63868 Großwallstatt, Germany. In the case of a magnetic spur gear, the two magnet wheels form two magnet rings that are magnetized with a plurality of poles radially or laterally on the circumference and are firmly connected to the output shaft of the gear and to the motor shaft. Constantly magnetized permanent magnet rings are used as the magnetic material (e.g., rare-earth magnets or ferrite magnets). Although both magnet rings have different diameters and numbers of poles, they have the same height to ensure optimum torque transmission for the minimum possible use of permanent magnet material. The magnet rings are arranged so that pole surfaces of opposite polarity lie opposite one another in the narrowest air gap. If the magnet wheel that is firmly connected to the motor shaft is moved in either direction of rotation, the magnet wheel that is firmly connected to the output shaft follows suit in the opposite direction of rotation in accordance with the transmission ratio, due to the direct magnetic coupling of this rotary motion. The maximum torque that can be transmitted occurs when the magnet poles are rotated over half of the position of the poles relative to the other magnet wheel. Overloading of the gear does not lead to destruction of the wheels. On the contrary, the magnetic gear simultaneously performs the function of a slipping clutch.

SUMMARY OF THE INVENTION

It is accordingly an object of the invention to provide a gear stage with a preload torque of the type mentioned in the introduction hereto, wherein alternating tooth face contact is avoided.

With the foregoing and other objects in view, there is provided, in accordance with one aspect of the invention, a gear stage assembly having a gear stage with two meshing gearwheels for mechanically transmitting a torque, comprising individual magnets arranged in the form of a ring on each of the gearwheels in a manner corresponding to that of the teeth of the gearwheels, for producing magnetic forces in the gear stage, individual magnets of respective ones of the magnets formed in a ring being arranged with alternating polarity in the direction of rotation and forming a stage of magnets in a ring disposed parallel to the gear stage, for producing a preload torque in the gear stage.

In accordance with another feature of the invention, the two gearwheels are mounted so as to be movable axially relative to one another.

In accordance with a further feature of the invention, the magnets are permanent magnets, and the permanent magnets of one of the gearwheels are formed wider in the axial direction than the permanent magnets of the other of the gearwheels of the gear stage, and wherein the two gearwheels are mounted so as to be movable axially relative to one another.

In accordance with an added feature of the invention, the individual magnets, respectively, are provided on a magnet wheel which is connected to a respective gearwheel so as to be fixed against rotation relative thereto.

In accordance with an additional feature of the invention, the individual magnets are distributed equidistantly with a pitch over the circumference of the gearwheels.

In accordance with yet another feature of the invention, the individual magnets of the two magnet wheels are arranged in positions displaced a given value from one another.

In accordance with yet a further feature of the invention, the given value is half the magnet pitch.

In accordance with yet an added feature of the invention, the gearwheels have a helical toothing, and axial travel of the gearwheels is limited to a maximum value.

In accordance with a concomitant aspect of the invention, there is provided a varnishing unit with a gear stage assembly having a gear stage with two meshing gearwheels for mechanically transmitting a torque, comprising individual magnets arranged in the form of a ring on each of the gearwheels in a manner corresponding to that of the teeth of the gearwheels, for producing magnetic forces in the gear stage, individual magnets of respective ones of the magnets formed in a ring being arranged with alternating polarity in the direction of rotation and forming a stage of magnets in a ring disposed parallel to the gear stage, for producing a preload torque in the gear stage.

According to the invention, the aforementioned objects are achieved by providing a gear stage assembly with individual magnets of a magnet wheel, which are arranged with alternating polarity in the direction of rotation and form a magnet-wheel stage, parallel to the gear stage, for the production of a preload torque in the gear stage. The system thereby obtained is contact-free, wear-free and inexpensive and provides high preload torques while being of simple design and narrow width in construction. In particular, an autonomous system that requires no additional energy is also achieved thereby.

According to a preferred embodiment, the permanent magnets of one gearwheel are made wider in the axial direction than the permanent magnets of the other gearwheel of the gear stage, and the two gearwheels and magnet wheels are mounted so that they can be moved axially relative to one another. This ensures that a constant and defined preload torque acts in every axial position of the two gearwheels or magnet wheels. According to the invention, there are furthermore no axial forces acting during the process of movement. Because one magnet wheel is made wider than the other magnet wheel by an amount corresponding to the amount of travel, the other magnet wheel remains invariably in the magnetic field at all times during the movement, and the set preload torque thus remains constant.

As an alternative or as an addition, it is also possible to change the degree of overlap of the magnet elements in a simple manner by the axial movement of the two gearwheels or magnet wheels, especially if both magnet wheels are of the same width. As a result, the magnitude of the preload torque in the gear stage can be adjusted without problems as a function of the operating conditions, and the gear stage can be operated with a definite preload torque.

The individual magnets are each advantageously arranged on a magnet wheel that is connected in a rotationally fixed manner to the gearwheel or the shaft of the gear stage. This provides a construction that is simple in terms of design, and can be retrofitted or replaced quickly.

To produce a preload torque that acts as uniformly as possible, the individual magnets are distributed equidistantly over the circumference of the gearwheels and magnet wheels, respectively. The individual magnets of the two magnet stages are advantageously arranged in positions displaced by half the magnet pitch relative to one another. A maximum preload torque in the gear stage can thereby be achieved for a given size of the magnet elements and given positioning of the magnet wheels relative to one another.

Other features which are considered as characteristic for the invention are set forth in the appended claims.

Although the invention is illustrated and described herein as embodied in a gear stage assembly with a preload torque, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
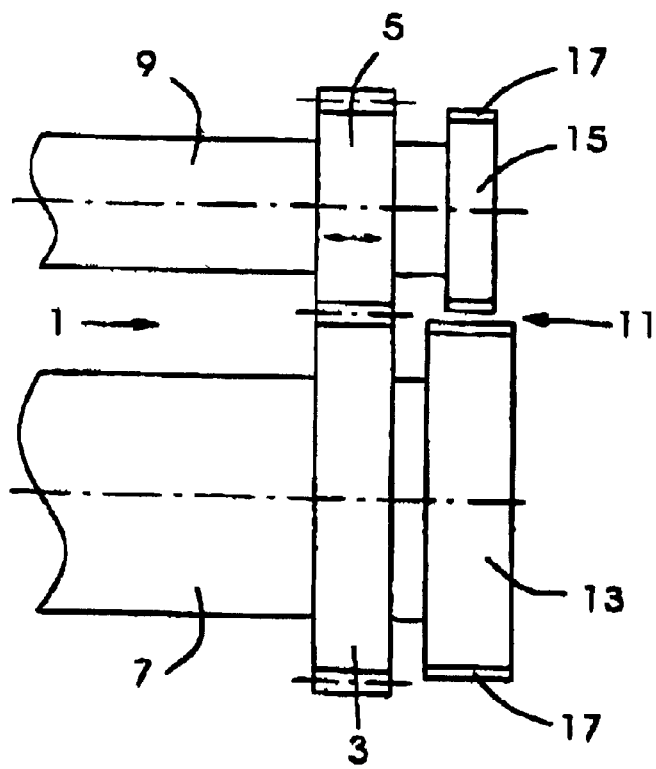
FIG. 1 is a diagrammatic side elevational view of a gear stage with a magnet-wheel stage assembled in parallel therewith.
Figure 2:
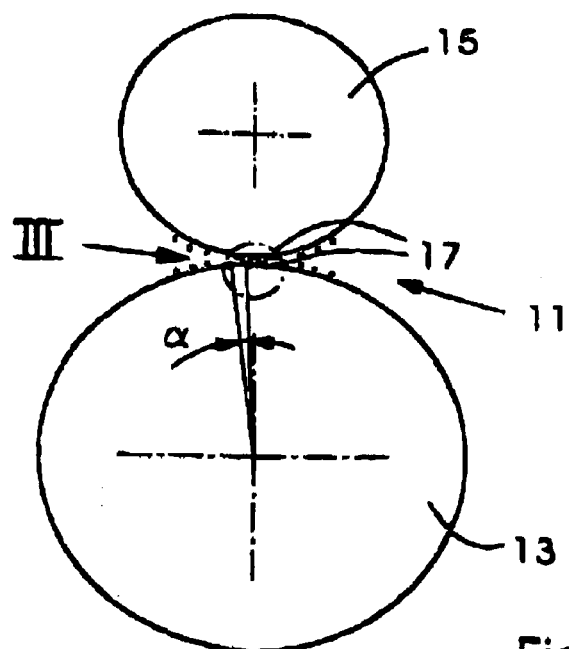
FIG. 2 is a diagrammatic front elevational view of the magnet-wheel stage as seen from the right-hand side of FIG. 1.

Referring now to the drawings and, first, particularly to FIG. 1 thereof, there is shown therein a varnishing unit from the printing-machine sector, by example, having a gear stage assembly 1 with a first gearwheel 3 and a second gearwheel 5. In this regard, the first gearwheel 3 is secured on an impression cylinder illustrated as a drive or input shaft 7, so as to be fixed against rotation relative thereto, and the second gearwheel 5 is secured on a varnishing blanket cylinder illustrated as a driven or output shaft 9. The gear stage assembly 1, furthermore, has a magnet-wheel stage 11, which is formed by a first magnet wheel 13 and a second magnet wheel 15. The two magnet wheels 13 and 15, respectively, are secured on the impression cylinder 7 and the varnishing blanket cylinder 9 in axially offset positions adjacent to the two gearwheels 3 and 5, and fixed against rotation relative thereto. Permanent magnets 17, e.g., neodymium-iron-boron magnets, are arranged mutually equidistantly, with a graduation or pitch α, on the circumference of the magnet wheels 13 and 15 (FIGS. 2 and 3).

Figure 3:
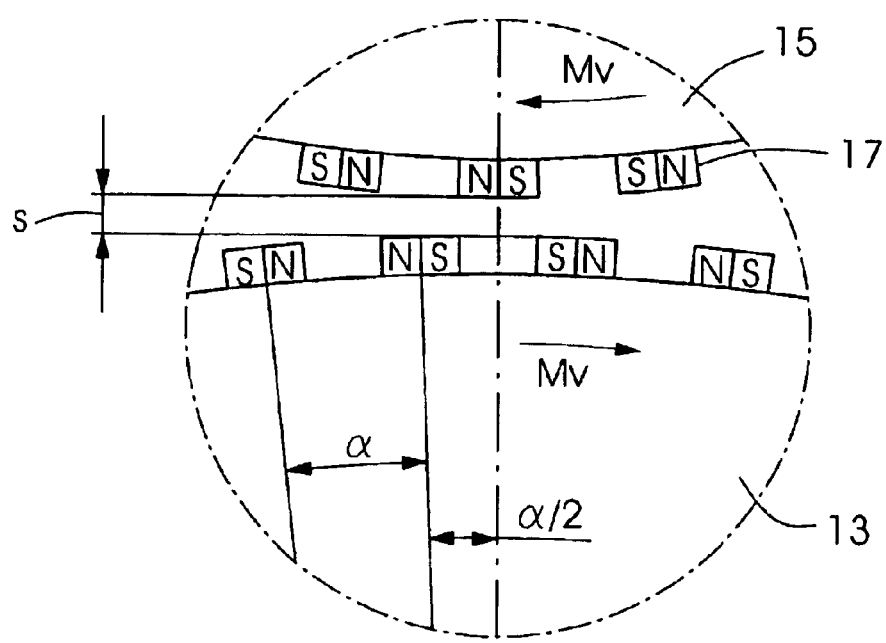
FIG. 3 is an enlarged fragmentary view of FIG. 2, showing an encircled detail III of permanent magnets, and produced preload torques.

According to FIG. 3, the permanent magnets 17 are secured on the end faces of the magnet wheels 13 and 15 and leave a defined air gap s therebetween in the region of engagement of the gearwheels 3 and 5. At the same time, the polarity of the magnets 17 is constant in the axial direction of the magnet wheels 13 and 15. The polarity of two adjacent magnets 17 on the circumference of the magnet wheel 13 and 15, respectively, is aligned so that two poles of the same polarity of two permanent magnets 17 are always opposite one another (N/S-S/N-N/S-S/N-N/S). Because magnets of the same polarity repel one another and magnets of opposite polarity attract one another, the arrangement of the magnets 17 on the two magnet wheels 13 and 15 produces a preload torque Mv in the gear stage 1. This torque Mv is a torque that acts only within the gear stage assembly 1 and does not pose an additional load on a machine driving the varnishing unit. In this arrangement, the two magnet wheels 13 and 15 of a stage assembly are preferably arranged offset relative to one another by half the magnet pitch a in order to produce the maximum preload torque Mv (FIG. 3). If the width of the magnet wheels 13 and 15 is just 10 mm, for example, it is possible to achieve a preload torque Mv of about 10 Nm, for example, which is thus sufficient to avoid alternating tooth face contact in the varnishing unit or gear stage assembly 1. Doubling the width of the magnet wheels 13 and 15 accordingly leads to a doubling of the preload torque Mv.

There is a possibility of moving the varnishing-blanket cylinder 9 axially. The preload torque of, for example, 10 Nm should act in each axial position of the cylinder. Moreover, there should be no axial forces acting during the process of movement. If one of the magnet wheels 13 and 15 is made wider than the other magnet wheel by an amount corresponding to the amount of travel, the other magnet wheel remains invariably in the magnetic field at all times during the movement. The preload torque Mv thus remains constant. Moreover, there is no force in the axial direction to brake the traversing movement during the process of movement if the aforedescribed arrangement of the permanent magnets 17 is adopted. Because the permanent magnets 17 operate without making contact, there is also no problem in moving the two gearwheels 3 and 5 radially out of mesh. The further apart the two magnet wheels 13 and 15 are, the smaller are the preload torques Mv. The position, which is preferably $\alpha/2$, must be ensured by a locating aid, for example, as the gearwheel stage assembly 1 is moved back together.

If necessary or desirable, a magnetic shield should be provided in the gear stage assembly in order to avoid interference with existing electrical components of the varnishing unit.

In another embodiment, the two gearwheels 3 and 5 are connected to one another by helical toothing. In this embodiment, movement of the two gearwheels 3 and 5 relative to one another results in a twisting of the magnet wheels 13 and 15 relative to one another. As a result, the magnet wheels leave the preferred position relative to one another, wherein the magnet wheels 13 and 15 are offset half the magnet pitch $\alpha$ from one another. In the case wherein the gearwheels 3 and 5 have helical toothing, the preload torque thus decreases when the gearwheels 3 and 5 are axially displaced. A minimum preload torque is required for the invention to work, and the maximum axial travel of the gearwheels 3 and 5 is therefore preferably limited in the case of helical toothing.

I claim:

1. A gear stage assembly, comprising:
a gear stage with two meshing gearwheels for mechanically transmitting a torque, said gear stage including individual magnets each having a magnetic axis, said magnets disposed in the form of non-meshing rings separate from and respectively mounted to each of said gearwheels in a manner corresponding to that of the teeth of said gearwheels, for producing magnetic forces in said gear stage, individual magnets of respective ones of said magnets formed in said rings being disposed with said magnetic axis aligned substantially parallel to a direction of rotation of said gearwheels and with alternating polarity in the direction of rotation and forming a stage of magnets in said rings disposed parallel to said gear stage, for producing a preload torque in said gear stage.

2. The gear stage assembly according to claim 1, wherein the two gearwheels are mounted so as to be movable axially relative to one another.

3. The gear stage assembly according to claim 2, wherein the gearwheels have a helical toothing, and axial travel of the gearwheels is limited to a maximum value.

4. The gear stage assembly according to claim 1, wherein said magnets are permanent magnets, and the permanent magnets of one of the gearwheels are formed wider in the axial direction than the permanent magnets of the other of the gearwheels of the gear stage, and wherein the two gearwheels are mounted so as to be movable axially relative to one another.

5. The gear stage assembly according to claim 1, wherein said individual magnets, respectively, are provided on a magnet wheel which is connected to a respective gearwheel so as to be fixed against rotation relative thereto.

6. The gear stage assembly according to claim 1, wherein said individual magnets are distributed equidistantly with a pitch over the circumference of the gearwheels.

7. The gear stage assembly according to claim 6, wherein said individual magnets of said two rings are disposed in positions displaced a given value from one another.

8. The gear stage assembly according to claim 7, wherein said given value is half the magnet pitch.

9. A varnishing unit with a gear stage assembly, comprising:
a gear stage with two meshing gearwheels for mechanically transmitting a torque, said gear stage including individual magnets each having a magnetic axis, said magnets disposed in the form of non-meshing rings separate from and respectively mounted to each of said gearwheels in a manner corresponding to that of the teeth of said gearwheels, for producing magnetic forces in said gear stage, individual magnets of respective ones of said magnets formed in said ring being disposed with said magnetic axis aligned substantially parallel to a direction of rotation of said gearwheels and with alternating polarity in the direction of rotation and forming a stage of magnets in said ring disposed parallel to said gear stage, for producing a preload torque in said gear stage.

10. A gear stage assembly, comprising:
a gear stage with two meshing gearwheels for mechanically transmitting a torque, said gear stage including individual magnets each having a magnetic axis and being disposed in a ring separate from and mounted to each of said gearwheels in concordance with the teeth of said gearwheels, said rings having a defined air gap between one another, and said magnets generating magnetic forces in said gear stage, individual magnets of respective ones of said magnets formed in said ring being disposed with said magnetic axis aligned substantially parallel to a direction of rotation of said gearwheels and with alternating polarity in the direction of rotation and forming a stage of magnets in said ring disposed parallel to said gear stage, for producing a preload torque in said gear stage.

* * * * *